No. 631,363. Patented Aug. 22, 1899.
C. E. FERREIRA.
FEED WATER HEATER.
(Application filed Aug. 12, 1895.)
(No Model.) 2 Sheets—Sheet 1.
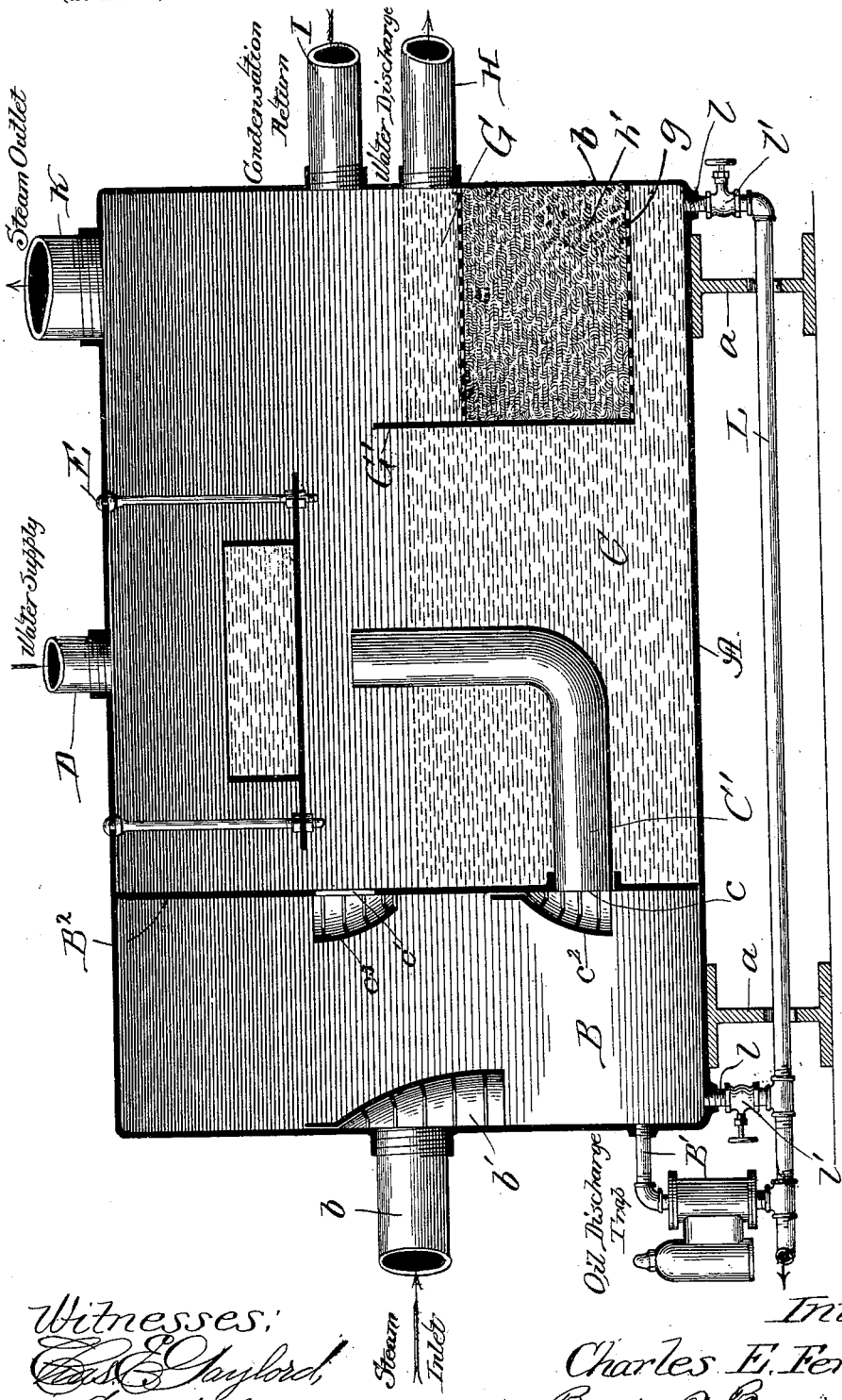
Witnesses:
Inventor:
Charles E. Ferreira, No. 631,363. Patented Aug. 22, 1899.
C. E. FERREIRA.
FEED WATER HEATER.
(Application filed Aug. 12, 1895.)
(No Model.) 2 Sheets—Sheet 2.
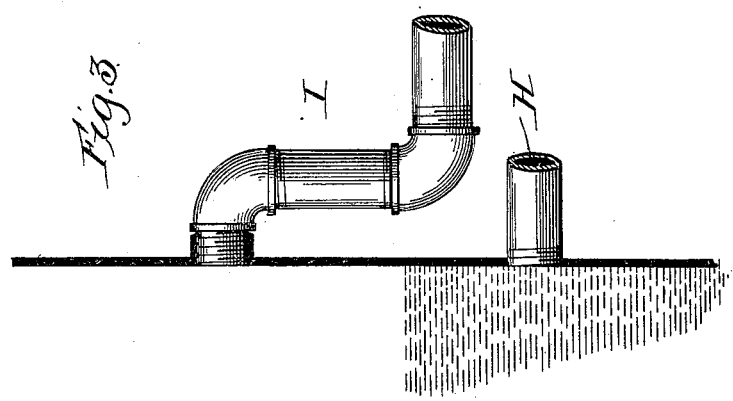
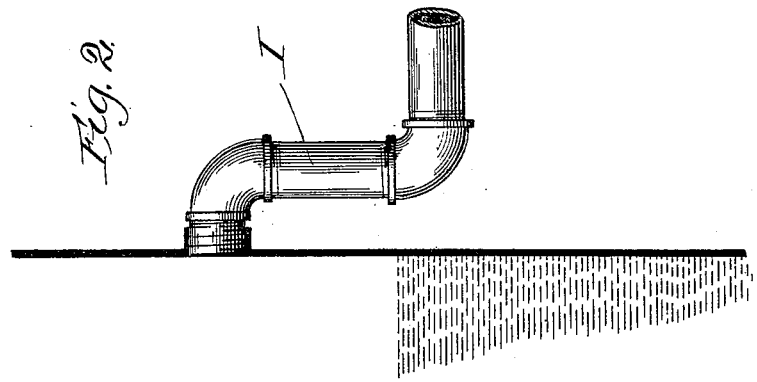

UNITED STATES PATENT OFFICE.

CHARLES E. FERREIRA, OF CHICAGO, ILLINOIS.

FEED-WATER HEATER.

SPECIFICATION forming part of Letters Patent No. 631,363, dated August 22, 1899.

Application filed August 12, 1895. Serial No. 559,027. (No model.)

*To all whom it may concern:*

Be it known that I, CHARLES E. FERREIRA, a citizen of the United States, residing at Chicago, in the county of Cook and State of Illinois, have invented a new and useful Improvement in Feed-Water Heaters, of which the following is a specification.

The object of my invention is to provide a simple, economical, and efficient feed-water heater adapted to receive the exhaust-steam from an engine, pump, or similar machine and also the products of condensation from a circulating system and utilize the same in heating and purifying water and for other purposes; and the invention consists in the features and combinations hereinafter described and claimed.

In the accompanying drawings, Figure 1 is a vertical central sectional elevation of my improved feed-water heater; Fig. 2, a detail view showing the end or side of a feed-water heater with the pipe for introducing water of condensation entering above the water-level and having a bend outside below the water-level; and Fig. 3, the same as Fig. 2, showing the discharge-pipe for drawing off water adjacent to the pipe for introducing water of condensation.

In constructing my improved feed-water heater I use a tank A, of any desired form and size, preferably cylindrical in transverse section, placed horizontally upon the base or ground. Supports $a$, preferably made of I-beams, are used to sustain the tank, though this form is immaterial and may be varied to suit different circumstances and conditions. I divide this tank or receptacle, preferably into three chambers. The first chamber B is at or near the end of the tank to which the exhaust-pipe $b$, leading from the exhaust of an engine or pump, is connected, and operates as an expansion-chamber. Arranged opposite the interior opening of the exhaust-pipe is a deflecting or baffle plate $b'$ for the purpose of breaking the current of steam, so as to change its direction, and thus enable the water or oil to more readily drop to the bottom of the chamber, from which it may be drawn off from the oil-discharge trap $B'$.

Arranged adjacent to and preferably in line with the expansion-chamber is a heating and settling chamber C, which receives the exhaust-steam or water-supply. To permit the exhaust-steam to enter this heating-chamber, I provide the partition $B^2$, that separates it from the expansion-chamber, with one or more openings. As shown there are two openings $c$ and $c'$, in front of which are preferably arranged deflecting-plates $c^2$ and $c^3$. To the lower opening is secured a bent pipe $C'$, so that the exhaust-steam may be conducted up above the water-line, which may be regulated or maintained in any desired manner—preferably by means of a float. The use of a float is so well known that it is unnecessary to illustrate it or describe it in detail.

An inlet or feed pipe D is secured to the tank or heating-chamber for introducing water, and a drip-pan E is arranged below the end of this pipe. This pan is in such position that steam entering from the expansion-chamber contacts its bottom surface and assists in heating the same, as well as the water overflowing therefrom, which overflow-water mingles with the steam above the water-surface in the heating-chamber.

To filter the water from the heating and settling chamber and separate it from the oil which is contained in greater or smaller quantities in all exhaust-steam from engines, I provide a third chamber G, which I call a "filtering-chamber" and which is preferably at the end farthest from the expansion-chamber and at the lower part thereof. This filtering-chamber, in which any desired filtering material may be used, is preferably perforated at both its bottom and top. The partition $G'$, which separates the filtering-chamber from the heating and settling chamber, is shown in the drawings as being carried up but a short distance above the water-line; but the chamber will work as well and perform its functions whether the partition be carried up to the top or ends at any point above the water-line.

Connected to the filtering-chamber, preferably above its perforated top, but below the working water-level, is a discharge-pipe H, which may lead to a boiler, pump, or any other desired place.

To heat the products of condensation as they return from the circulating system, a return-pipe I is connected to the discharge end of the tank above the water-level, so that it discharges its combined returns directly into the space above the water-line, which is filled with steam. This enables the return water of condensation to be superheated, which is impossible when it is sealed inside the heater or returned below the water-level. This return-pipe is preferably secured to the end of the tank adjacent to the water-discharge pipe in such position that the returned water of condensation may be drawn off without the necessity of passing through the filtering-chamber. The location of this return-pipe, however, may be changed to suit varying circumstances or conditions. The return-pipe is preferably bent outside the heater so that its lowest portion comes below the water-line in order to form a water-trap and prevent the backing up of steam into the circulating system. So far as I know, this method of introducing the water of condensation into the heater above the water-level, so as to enable it to be superheated by steam without the use of inside traps or sealing devices, is broadly new in this invention. This is also true with reference to providing means for drawing off the returned water of condensation immediately after it is superheated and before it mingles to any appreciable extent with other water in the heater. This being the case, I do not wish to be understood as limiting myself to the use of these features in the particular form of heater shown or in any other particular form of heater.

The tank is provided with a steam-outlet K, secured in any desired position, for the purpose of allowing either exhaust or live steam to circulate through a heating system or to discharge waste-steam. To the lower portion of the tank is secured a drain-pipe L, having nipples or branches $l$ connecting it to the expansion and water chamber, and valves $l'$ are secured to the nipples or branches for the purpose of opening or closing the same. This drain-pipe may be used as a blow-off and to wash or clean the chambers.

The advantages of my invention are that it provides a form of heater especially adapted for use in low basements in connection with heating systems of buildings and that it provides efficient means for superheating water of condensation.

Although I have described my improved feed-water heater as consisting, essentially, of three chambers communicating with each other, it will of course be understood that in some cases the filtering-chamber may be omitted or additional chambers used; nor is it necessary that the chambers be arranged in the exact position or relation to each other shown in the drawings. As already stated, also, the means for introducing water of condensation above the water-level and of drawing off such water before it mingles to any appreciable extent with other water in the heater may be used in other forms and combinations, as well as the particular form or combination shown.

Other features may also be omitted or varied to suit special circumstances. For instance, it is unnecessary that there be more than one opening in the partition between the expansion and heating chambers or that any pipe for introducing exhaust-steam into or through the water be used or when used that it be bent or extended above the water-line. It will be understood, therefore, that I do not intend to limit myself to minor features or details of construction or to the use at all times of all the parts described. On the contrary, I contemplate varying the form or construction and omitting parts or using equivalents, as circumstances may suggest or render expedient.

I claim—

1. A feed-water heater comprising a water holding and heating chamber and a filtering-chamber communicating with the steam-space above the water-level of the heating-chamber, a condense-water return-pipe entering the heater above the water-level of the filtering-chamber and also above the water-level of the heating-chamber, such pipe emptying directly into the filtering-chamber, whereby the condense water may be heated and withdrawn without traversing the heating-chamber, a discharge-pipe from the filtering-chamber and a steam pipe or passage communicating with the heating-chamber.

2. In combination with a feed-water heater having a heating-chamber and an outlet or purified-water chamber communicating directly with the steam-space above the water-level of the heating-chamber, of a condense-water return-pipe entering the heater above the water-level of the heating-chamber, such pipe emptying into the purified-water chamber whereby the condense water may be heated and withdrawn without traversing the heating-chamber, and an outlet-pipe communicating with the purified-water chamber at a point adjacent to the condense-water return-pipe.

3. In a feed-water heater, the combination of a horizontal receptacle or tank divided into an expansion-chamber and a heating and settling chamber arranged side by side and communicating with each other, means for introducing steam into the expansion-chamber, means for introducing water into the heating and settling chamber, means for introducing water of condensation into the heating and settling chamber above the water-level, and means for drawing off water from the heating and settling chamber, substantially as described.

4. In a feed-water heater, the combination of a horizontal receptacle or tank divided into an expansion-chamber, a heating and settling chamber and a filtering-chamber communicating with each other, such chambers being arranged in substantially the same horizontal plane, means for introducing steam into the expansion-chamber, means for introducing water into the heating and settling chamber, a pipe for introducing water of condensation into the heating and settling chamber above the water-level, and a pipe for drawing off water from the heating and settling chamber adjacent to the pipe for introducing water of condensation, substantially as described.

5. In a feed-water heater, the combination of a horizontal receptacle or tank divided into an expansion-chamber and a heating and settling chamber, such chambers being arranged side by side, means for introducing steam into the expansion-chamber, means for introducing water into the heating and settling chamber, a pipe extending from the expansion-chamber into the heating and settling chamber and extending above the water-level when in use, and means for drawing off water from the heating and settling chamber, substantially as described.

6. A feed-water heater comprising a tank or receptacle divided into three chambers arranged side by side, the first chamber being a steam or expansion chamber having a steam-inlet, the second chamber being a heating and settling chamber having a pipe leading from the steam-chamber to a point above the water-level in the heating-chamber and a third chamber being a filtering and outlet chamber for the heated and purified water and arranged beyond the other chambers in substantially the same horizontal plane, and a water-outlet leading from the outlet-chamber.

7. A feed-water heater comprising a tank or receptacle having arranged therein in substantially the same horizontal plane a steam-chamber, a heating-chamber and an outlet-chamber, means of communication between the chambers, a steam-inlet and a water-inlet and a water-outlet.

8. A feed-water heater comprising a tank or receptacle having arranged therein, in substantially the same horizontal plane, a steam-chamber, a heating-chamber and a filtering and outlet chamber respectively, a steam-inlet into the steam-chamber, a steam-pipe leading from the steam-chamber and into the adjacent heating-chamber below the water-level therein and extending upward therein above such level, a water-inlet into the heating-chamber, means of communication between the heating and outlet chambers and a water-outlet leading from the outlet-chamber.

9. A feed-water heater comprising a tank or receptacle having therein, in substantially the same horizontal plane, a steam-chamber, a heating-chamber and an outlet or purified-water chamber respectively, a steam-inlet for the steam-chamber, a water inlet and outlet, means of communication between the chambers and a condense-water return emptying into the outlet-chamber above the water-level therein.

10. A feed-water heater comprising a tank or receptacle having therein, a steam-chamber, a heating-chamber and an outlet or purified-water chamber respectively, a steam-inlet for the steam-chamber, a water inlet and outlet, means of communication between the chambers, such chambers being arranged in the same horizontal plane and having the same water-level in the heating-chamber and outlet-chamber.

11. A feed-water heater comprising a tank or receptacle having therein a steam-chamber, a heating-chamber and an outlet or purified-water chamber respectively, a steam-inlet for the steam-chamber, a water-inlet for the heating-chamber, a water-outlet for the outlet-chamber, and a steam-pipe entering from the steam-chamber into the heating-chamber and extending above the water-level therein, the outlet-chamber communicating substantially at its bottom with the heating-chamber so as to have the same water-level and also communicating at its top with the steam-space above the level of the water in the heating-chamber.

12. A feed-water heater comprising a tank or receptacle having a steam-chamber B, an inlet $b$ therein, a heating-chamber C arranged at the side of the steam-chamber, ports or openings $c$ and $c'$ from the steam-chamber into the heating-chamber, the former opening below and the latter opening above the water-level in the heating-chamber, a steam-pipe $C'$ leading from the port $c$ through the body of water in the heating-chamber and extending up above the water-level, a water-inlet D into the heating-chamber, an outlet-chamber G having the same water-level as the heating-chamber and an outlet H therefrom.

13. A feed-water heater comprising a tank or receptacle having a steam-chamber B, an inlet $b$ therein, a heating-chamber C arranged at the side of the steam-chamber, ports or openings $c$ and $c'$ between the steam and heating chambers, deflecting-plates $c^2$ and $c^3$ for the openings respectively, a steam-pipe $C'$ leading from opening $c$ through the body of water in the heating-chamber and extending up above the water-level therein, a water-inlet D for the heating-chamber, a chamber G communicating at its bottom with the water in the heating-chamber and at its top with the steam-space above the water-level, a water-outlet H from the chamber G and a condense-water inlet I entering the tank above the water-level of the chamber G and emptying therein, said three chambers being arranged side by side.

14. A feed-water heater comprising a heating-chamber and a filtering-chamber, a condense-water return main or pipe emptying the condense-water directly into the filtering-chamber above the water-level thereof without causing it to mingle with the water in the heating-chamber, such pipe having a trap or seal, and a discharge-pipe from the filtering-chamber.

CHARLES E. FERREIRA.

Witnesses:
EPHRAIM BANNING,
THOMAS F. SHERIDAN.